(12) United States Patent
Molgaard (10) Patent No.: US 9,844,752 B2
(45) Date of Patent: Dec. 19, 2017

(54) SYSTEM, A USE OF SUCH A SYSTEM AND A MULTI SYSTEM FOR CLEANING EXHAUST GAS

(71) Applicant: ALFA LAVAL CORPORATE AB, Lund (SE)

(72) Inventor: Soren Molgaard, Stovring (DK)

(73) Assignee: ALFA LAVAL CORPORATE AB, Lund (SE)

( * ) Notice: Subject to any disclaimer, the term of this patent is extended or adjusted under 35 U.S.C. 154(b) by 321 days.

(21) Appl. No.: 14/431,639

(22) PCT Filed: Nov. 6, 2013

(86) PCT No.: PCT/EP2013/073098
§ 371 (c)(1),
(2) Date: Mar. 26, 2015

(87) PCT Pub. No.: WO2014/082823
PCT Pub. Date: Jun. 5, 2014

(65) Prior Publication Data
US 2015/0238897 A1    Aug. 27, 2015

(30) Foreign Application Priority Data

Nov. 29, 2012    (EP) .................................... 12194809

(51) Int. Cl.
*B01D 53/78*    (2006.01)
*B01D 53/92*    (2006.01)
(Continued)

(52) U.S. Cl.
CPC .......... *B01D 53/78* (2013.01); *B01D 53/507* (2013.01); *B01D 53/75* (2013.01); *B01D 53/92* (2013.01);
(Continued)

(58) Field of Classification Search
CPC ...... B01D 53/507; B01D 53/75; B01D 53/78; B01D 53/92; B01D 53/96;
(Continued)

(56) References Cited

U.S. PATENT DOCUMENTS 3,781,407 A      12/1973   Kamijo et al.
3,923,478 A  *   12/1975   Fiedler ................. C01G 28/005
                                                      423/617

(Continued)

FOREIGN PATENT DOCUMENTS

DE    35 05 027 A1    8/1986
DE    35-21 829 A1    2/1987
(Continued)

OTHER PUBLICATIONS

Office Action (Text of First Office Action) dated Oct. 28, 2016, by the State Intellectual Property Office of the People's Republic of China in corresponding Chinese Application No. 2013800621369. (6 pages).

(Continued)

*Primary Examiner* — Frank Lawrence
(74) *Attorney, Agent, or Firm* — Buchanan Ingersoll & Rooney PC (57) ABSTRACT

A system, a use of such a system and a multi system for cleaning exhaust gas from a combustion engine. The system comprises a first exhaust gas scrubber to communicate with a scrubber water circulation tank. A first outlet of the first exhaust gas scrubber is connectable to a first inlet of the scrubber water circulation tank, and a first inlet of the first exhaust gas scrubber is connectable to a first outlet of the scrubber water circulation tank, to enable circulation of scrubber water between the scrubber water circulation tank and the first exhaust gas scrubber. An air supply device feeds air into the first exhaust gas scrubber to aerate the scrubber (Continued)

water during its passage through the first exhaust gas scrubber. Accordingly, a second inlet of the first exhaust gas scrubber is arranged to be connected to an outlet of the air supply device.

10 Claims, 5 Drawing Sheets

(51) Int. Cl.
*F01N 3/04* (2006.01)
*B01D 53/96* (2006.01)
*B01D 53/50* (2006.01)
*B01D 53/75* (2006.01)
*F01N 3/08* (2006.01)
*F02M 26/15* (2016.01)

(52) U.S. Cl.
CPC .............. *B01D 53/96* (2013.01); *F01N 3/04* (2013.01); *F01N 3/085* (2013.01); *F02M 26/15* (2016.02); *B01D 2251/106* (2013.01); *B01D 2251/604* (2013.01); *B01D 2259/4566* (2013.01); *F01N 2570/04* (2013.01); *F01N 2590/02* (2013.01); *Y02T 10/20* (2013.01)

(58) Field of Classification Search
CPC ........ B01D 2251/106; B01D 2251/604; B01D 2259/4566; F02N 3/04; F02N 3/085; F02N 2570/04; F02N 2590/02; F02M 26/15; Y02T 10/20
USPC .................. 95/187, 195–197, 205, 235, 236; 96/234–241
See application file for complete search history.

(56) References Cited

U.S. PATENT DOCUMENTS

| | | | |
|---|---|---|---|
| 4,085,194 A | 4/1978 | Otani et al. | |
| 4,323,371 A | 4/1982 | Ritvanen | |
| 4,337,230 A | 6/1982 | Ellestad et al. | |
| 5,665,317 A | 9/1997 | Laslo | |
| 5,676,716 A * | 10/1997 | Gohara | B01D 53/504 261/124 |
| 5,990,330 A | 11/1999 | Sulzbach et al. | |
| 7,527,679 B2 * | 5/2009 | Kimura | B01D 53/504 261/90 |
| 7,976,809 B2 | 7/2011 | Anttila et al. | |
| 8,038,774 B2 | 10/2011 | Peng | |
| 8,440,006 B2 * | 5/2013 | Laslo | B01D 53/18 261/121.1 |
| 2006/0251559 A1 | 11/2006 | Schleicher et al. | |
| 2010/0206171 A1 | 8/2010 | Peng | |
| 2011/0107736 A1 | 5/2011 | Chillar et al. | |
| 2012/0237423 A1 * | 9/2012 | Bialkin | B01D 53/346 423/240 R |

FOREIGN PATENT DOCUMENTS

| | | |
|---|---|---|
| DE | 36 04 063 A1 | 8/1987 |
| DE | 195 35 475 C1 | 4/1997 |
| DE | 197 41 120 A1 | 12/1998 |
| DE | 198 48 700 A1 | 4/1999 |
| DE | 198 15 207 C1 | 6/1999 |
| EP | 1 967 253 A1 | 9/2008 |
| EP | 2 353 701 A1 | 8/2011 |
| JP | 49-031595 A | 3/1974 |
| JP | S51-146372 A | 12/1976 |
| JP | S58-219923 A | 12/1983 |
| JP | 62-072518 A | 4/1987 |
| JP | H07-136454 A | 5/1995 |
| JP | 09173769 A | 7/1997 |
| JP | H09-192440 A | 7/1997 |
| JP | 2005-13295 A | 1/2005 |
| JP | 2009108848 A | 5/2009 |
| KR | 20010014637 A | 2/2001 |
| KR | 20110112133 A | 10/2011 |
| WO | 2012/107817 A1 | 8/2012 |

OTHER PUBLICATIONS

Office Action (Notice of Reasons for Rejection) dated Dec. 5, 2016, by the Japanese Patent Office in corresponding Japanese Patent Application No. 2015-544400. (6 pages).
English translation of Office Action (Notice of Reasons for Rejection) dated Jun. 27, 2016, by the Japanese Patent Office in corresponding Japanese Patent Application No. 2015-541100. (4 pgs).
International Search Report (PCT/ISA/210) dated Jan. 29, 2014, by the European Patent Office as the International Searching Authority for International Application No. PCT/EP2013/073098.
Written Opinion (PCT/ISA/237) dated Jan. 29, 2014, by the European Patent Office as the International Searching Authority for International Application No. PCT/EP2013/073098.
English translation of the Korean Office Action dated Jul. 20, 2016, by the Korean Intellectual Property Office in corresponding Korean Patent Application No. 10-2015-7016692. (5 pgs).

* cited by examiner

SYSTEM, A USE OF SUCH A SYSTEM AND A MULTI SYSTEM FOR CLEANING EXHAUST GAS

TECHNICAL FIELD

The invention relates to a system and a multi system for cleaning exhaust gas from a combustion engine, and to a use of such a system.

BACKGROUND ART

During the combustion of fossil fuels, sulphur in the fuel is released in form of sulphur oxides ($SO_X$). Other pollutants are primary particulate matter and nitrogen oxides ($NO_X$). It is well known that air pollution seriously impact people's health and the environment. It is also well known that sulphur dioxide and nitrogen oxides are the major precursors of acid rain.

So far, the legislation that has been setting the environmental standards for emission control for international shipping has lagged behind the land-based emission regulations. Present regulations include caps on the sulphur content of fuel oil as a measure to control $SO_X$ emissions. Special fuel-quality provisions exist for $SO_X$ in emission control areas and there are substantial reductions in the allowed fuel sulphur limits to be expected in the near future. The MARPOL Annex VI legislation, which went into effect in May 2005 following specifications from several European Union directives, has curbed the impact of marine diesel on the environment. By 2015, the legislations will be even stricter regarding by way of example fuel sulphur limits and $NO_X$ cap.

There are different emission reduction possibilities, either taken alone or in combination. One possibility is to use new fuels such as distillate fuels or low sulphur fuels. Another possibility is to further develop methods to control the emission of $SO_X$ such as wet scrubber technologies using alkaline agents such as NaOH-solutions, or dry scrubber technologies using granulated limestone ($Ca(OH)_2$).

It is well known in the marine industry today for the purpose of reducing $SO_X$ gases in the exhaust from a ship to apply Exhaust Gas Cleaning (EGC) for $SO_X$ reduction and Exhaust Gas Recirculation (EGR) for $SO_X$ and $NO_X$ reduction. Both the EGC and EGR processes may apply a wet scrubber technology using an alkaline agent such as a NaOH-solution for removal of $SO_X$. However, since the EGC process is applied on the low pressure side of the exhaust source and the EGR process is applied on the high pressure side it is not possible for them to share the same wet scrubber.

In the closed loop of a scrubber system, no matter if it is a scrubber to be operated as an EGC scrubber or as an EGR scrubber, the water is circulated through the scrubber absorbing $SO_2$ and the water is afterwards balanced with an alkaline agent such as NaOH to an almost neutral pH in the range of 7-8 before being circulated back to the scrubber. It is very important that the pH does not rise too high above pH 8, in that the scrubber will then start absorbing $CO_2$ from the exhaust. If this happens, the consumption of the alkaline agent will increase and hence the operational costs.

Another issue in the closed loop of a scrubber system is the so called Chemical Oxygen Demand (COD) which is a value describing how much oxygen is required to oxidize all organic and inorganic matter present in the scrubber water. A high COD value will in worst case lead to decreased oxygen levels in the oceans.

U.S. Pat. No. 4,085,194 discloses a method of removing sulphurous acid gas from smokes discharged from a variety of combustion facilities such as generating power plants. The method includes the step of oxidizing the sulphites into chemically stable sulphates by introducing air into the sea-water. The air is introduced by a rotating umbrella-type rotor which is submerged in a body of the sulphite-containing sea-water.

When $SO_2$ is absorbed in the water it undergoes the following three reactions; reaction 1 describes the absorption of $SO_2$ into the water phase, reaction 2 is the neutralization with NaOH and reaction 3 describes the oxidation of the absorbed $SO_2$ to its final inactive stage.

$$SO_2(g)+H_2O(l) \rightarrow H_2SO_3(aq) \quad (1)$$

$$H_2SO_3(aq)+2*NaOH(aq) \rightarrow Na_2SO_3(aq)+2*H_2O(l) \quad (2)$$

$$Na_2SO_3(aq)+\tfrac{1}{2}*O_2(aq) \rightarrow Na_2SO_4(aq) \quad (3)$$

Reactions 1 and 2 are fast, while reaction 3 is slow with an estimated half-life of at least 10 minutes provided enough oxygen is present. If all dissolved oxygen is consumed, reaction 3 will stop completely. When the final stage with $Na_2SO_4$ is reached, the sulphur is stabilized and the absorption process is finished.

After several hours of operation in the closed loop mode, the contents of $Na_2SO_4$ in the scrubber water has reached a level under which precipitation of $Na_2SO_4$ is a real risk. A discharge of the scrubber water from the scrubber system is thereby required.

Further, during the absorption process, oil and soot residues from the combustion process are transferred from the exhaust gas to the scrubber water. This increases both turbidity and COD values.

According to current legislations regarding discharge of scrubber water, several discharge criteria must be fulfilled, three of these discharge criteria's are of specific interest for this invention:

The pH value should be larger than 6.5.
The turbidity (solid contents) should be below 25 NTU/FNU.
A low COD value. No specific limit has yet been determined but it is expected to be similar to IMO/Marpo Annex 4, i.e. 125 mg/L.

SUMMARY

It is an object of the invention to at least partly overcome one or more of the above-identified limitations of the prior art. In particular, it is an object of the invention to enable fulfillment of expected future requirements regarding water to be discharged. More precisely, it is an object of the invention to provide a system, a multi system and a use of a system for cleaning exhaust gas from a combustion engine which provide a possibility to lower a COD value of water to be discharged.

The system according to the invention comprises a first exhaust gas scrubber arranged to communicate with a scrubber water circulation tank. A first outlet of the first exhaust gas scrubber is arranged to be connected, directly or indirectly, to a first inlet of the scrubber water circulation tank and a first inlet of the first exhaust gas scrubber is arranged to be connected, directly or indirectly, to a first outlet of the scrubber water circulation tank. Thereby, circulation of scrubber water between the scrubber water circulation tank and the first exhaust gas scrubber is enabled. The system is characterized in that it further comprises an air supply device arranged to feed air into the first exhaust gas scrubber to aerate the scrubber water during its passage through the first exhaust gas scrubber. Accordingly, a second inlet of the first exhaust gas scrubber is arranged to be connected, directly or indirectly, to an outlet of the air supply device.

Fresh air is free of charge. Thus, feeding ambient air into the first exhaust gas scrubber is an inexpensive way of aerating the circulating scrubber water. By the aeration, the oxygen content in the scrubber water passing the first exhaust gas scrubber will be increased. Referring back to equations (1)-(3) and the discussion thereof given above, this means that the amount of oxygen present in the scrubber water may be increased to a level high enough to ensure that the process described as equations (1)-(3) will proceed with a complete oxidation of the $SO_2$ absorbed in the scrubber water. Accordingly, the so called COD value describing how much oxygen is required to oxidize all organic and inorganic matter present in the scrubber water, may be kept low. From an environmental perspective this is of very high importance. Also, this is in line with expected future legislations regarding the COD value.

By using the first exhaust gas scrubber as an aerator, no special equipment but the air supply device (if such is not already present) may have to be installed, for example onboard a ship if that is where the first exhaust gas scrubber is installed. Instead already existent equipment may be used for the aeration and the first exhaust gas scrubber may be operated as usual and in the same way both to clean exhaust gases and to aerate scrubber water. Thus, a straightforward, cost efficient and space efficient solution is provided for. The first exhaust gas scrubber may be arranged to allow an alternating operation between aeration of scrubber water during its passage through the first exhaust gas scrubber and cleaning of exhaust gas being fed thereto from the combustion engine. Accordingly, the inventive system may be such that the air supply device is arranged to feed air into the first exhaust gas scrubber when no exhaust gas from the combustion engine is fed into the first exhaust gas scrubber, for example when the combustion engine is in a standstill-state.

The second inlet of the first exhaust gas scrubber may be arranged to be connected, directly or indirectly, to an outlet of the combustion engine. Thereby, the air from the supply device and the exhaust gas from the combustion engine are fed into the first exhaust gas scrubber through one and the same inlet, i.e. the second inlet. Such an embodiment enables a cheaper and less complicated system. Also, such an embodiment may make it easier to enable an already existing exhaust gas scrubber to perform the additional function of aerating the circulating scrubber water.

The air supply device may be a purge air fan which may be electrically driven or be driven by an auxiliary engine. Thereby, a relatively uncomplicated and cost-efficient system is enabled.

The scrubber water circulation tank may be comprised in the inventive system.

The system may further comprise means for chemicals supply to a flow of scrubber water from a second outlet of the scrubber water circulation tank. The resulting mixture of scrubber water and chemicals may be fed to a water cleaning unit. As an example, the chemicals may contain hydrogen peroxide ($H_2O_2$). Hydrogen peroxide is very reactive with the inorganic compounds in the scrubber water, whereby a very fast oxidization of the sulphites is made possible. Thus, the addition of hydrogen peroxide may be used to further lower the COD value in line with the equations (1)-(3) discussed above. The chemicals may also/alternatively contain an alkaline agent. It has been discovered that particle separation in a water cleaning unit may be enhanced significantly if the pH in the scrubber water may be increased to 8-10, and more preferred to 8.5-9.5. However, it has also been discovered that an increased pH value will result in a significant increased absorption of $CO_2$. By adding an alkaline agent such as NaOH (sodium hydroxide) or $Na_2CO_3$ (Sodium Carbonate) to the scrubber water in a position upstream to the water cleaning unit but downstream to the scrubber, the efficiency of the particle separation will be increased while not substantially affecting the uptake of $CO_2$ in the scrubber water. This is in line with the expected future legislations relating to discharge of water, i.e. a pH value being larger than 6.5 and a turbidity below 25 NTU/FNU. After passing the water cleaning unit, the cleaned scrubber water may either be discharged into the sea or be returned to the system for re-use in the first exhaust gas scrubber. The separated particulate matter and the inevitable waste water contained therein may be collected in a waste water tank for later discharge at a suitable reception facility.

The system may further comprise an analytical equipment arranged to evaluate a degree of oxidation of sulphites in the aerated scrubber water. This evaluation may be used to determine whether further aeration of the scrubber water is required or not.

The multi system according to the invention comprises a system as described above and a second exhaust gas scrubber. The second exhaust gas scrubber is arranged to communicate, directly or indirectly, with the scrubber water circulation tank to enable circulation of scrubber water between the scrubber water circulation tank and the second exhaust gas scrubber. The second exhaust gas scrubber is arranged to receive and clean the exhaust gas while at the same time the first exhaust gas scrubber is arranged to aerate the scrubber water during its passage through the first exhaust gas scrubber. Thereby, the multi system is redundant as the scrubbing is not solely relying on one single scrubber.

The system may comprise a third exhaust gas scrubber arranged to communicate with the scrubber water circulation tank to enable circulation of scrubber water between the scrubber water circulation tank and the third exhaust gas scrubber.

One or more of said exhaust gas scrubbers, i.e. one or more of the first, second and third exhaust gas scrubbers, may be of EGR type. Accordingly, one or more of the first, second and third exhaust gas scrubbers may be of EGC type.

The use according to the invention involves use of a system as described above for alternating operation between aeration of scrubber water during its passage through the first exhaust gas scrubber and cleaning of exhaust gas from the combustion engine.

Still other objectives, features, aspects and advantages of the invention will appear from the following detailed description as well as from the drawings.

BRIEF DESCRIPTION OF THE DRAWINGS

Embodiments of the invention will now be described, by way of example, with reference to the accompanying schematic drawings, in which.

DETAILED DESCRIPTION

Before going into details of the invention, the general principle of an exhaust gas scrubber will be described.

A typical exhaust gas scrubber to be used on-board a ship is a so called wet scrubber of the EGC type (Exhaust Gas Cleaning). A wet EGC scrubber process as such is well known in the art and the general idea is to remove particulate matter such as soot, oil and heavy metals in the exhaust gas from a combustion engine, such as a diesel engine on-board a ship, and at the same time wash out acid gases such as $SO_X$ from the exhaust gas by a flow of water. $SO_X$ is formed during the combustion process when sulphur in the fuel combines with oxygen. The basic principle when using wet scrubbers is that the $SO_X$ is neutralized and bound as sulphates or sulphites when reacting with the alkaline water used in the EGC scrubber.

Figure 1:
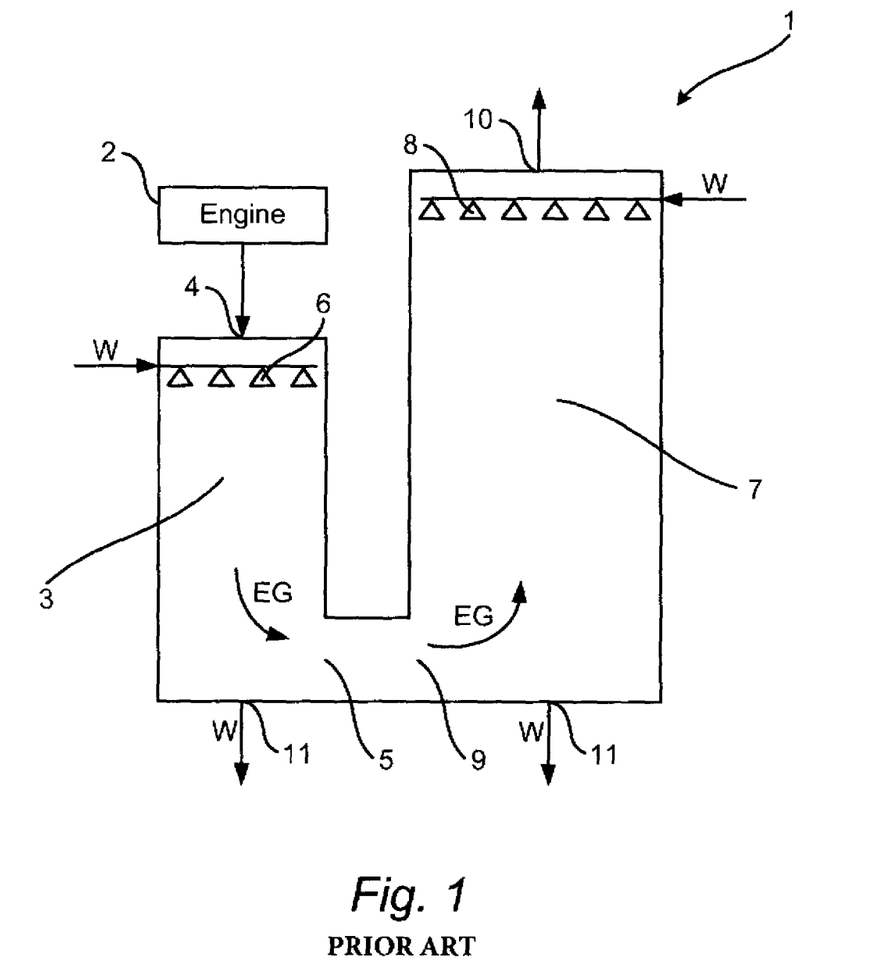
FIG. 1 is a schematic overview of a typical EGC scrubber of the wet scrubber type.

A typical example of an exhaust gas scrubber 1 of the wet scrubber type is disclosed in FIG. 1, to which reference now is made. The exhaust gas EG from a combustion engine 2 is passed through a first chamber 3, via an inlet 4 thereof to an outlet 5 thereof, while being flushed with a large flow of water W to quickly reduce the temperature from about 180-250° C. to about 45-55° C. The flushing may be made by a plurality of nozzles 6. By cooling the exhaust gas EG, the volume thereof may be reduced, allowing a second chamber 7, an absorption chamber, of the exhaust gas scrubber 1 to be smaller dimensioned. Thereby the required space on-board the ship may be reduced which is advantageous not at least in case of retro-fitting an exhaust gas scrubber 1. In the second chamber 7, the pre-washed exhaust gas EG is subjected to a counter flow of water W from nozzles 8 while being guided from an inlet 9 thereof, normally a bottom inlet communicating with the outlet 5 of the first chamber 3, to an outlet 10 thereof, normally a top outlet. During the passage through the second chamber 7, the exhaust gas EG may react with an alkaline agent supplied (not disclosed) to the water W prior to the exhaust gas scrubber 1. During the reaction with the alkaline agent, the $SO_X$ contained in the exhaust gas will be dissolved in the water and oxidized to sulphates if enough oxygen is present. Particulate matter contained in the exhaust gas EG may be washed out together with the water W via bottom outlets 11 arranged in the first and second chambers 3, 7.

To further improve the removal efficiency of the exhaust gas scrubber 1, the residence time of the exhaust gas EG in the second chamber 7 may be increased. Alternatively, the available surface area inside the second chamber 7 may be increased by causing a larger contact surface with the exhaust gas EG. Well known techniques for this purpose is the use of spray nozzles, packed towers or an aspirator (not disclosed).

The thus cleaned exhaust gas EG may be emitted into the ambient air via the outlet 10 after a quality control (not disclosed) ensuring that it meets legislated emission levels.

An exhaust gas scrubber 1 may in general use seawater or freshwater, or even a mixture thereof.

Figure 2A:
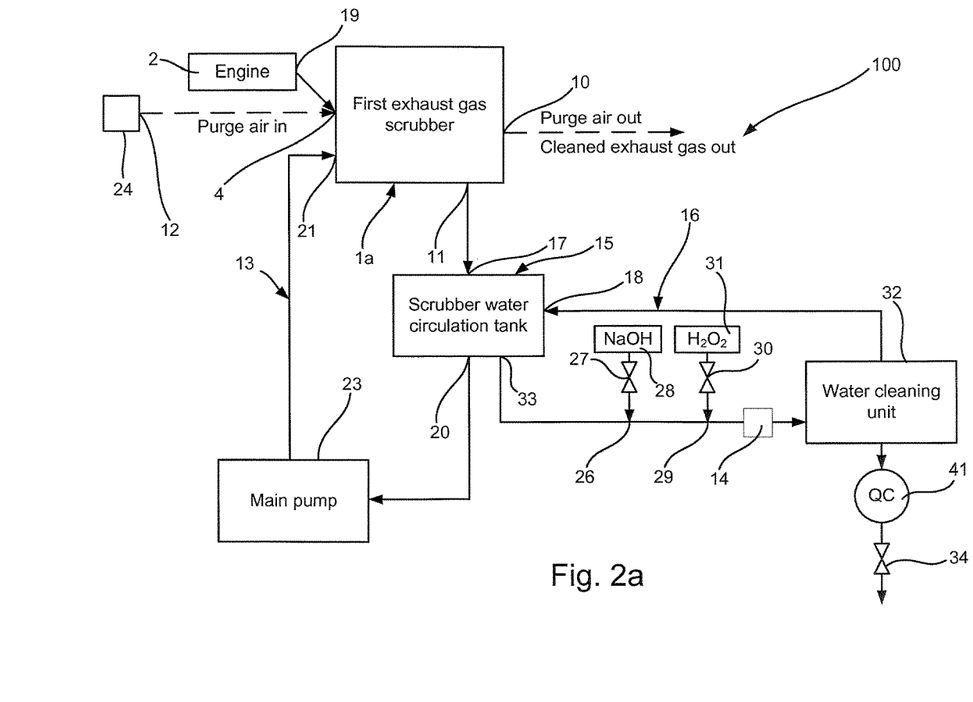
FIG. 2a is a schematic overview of a system according to one embodiment of the invention.

Now referring to FIG. 2a, one embodiment of the inventive system 100 is disclosed. The inventive system comprises a scrubber process loop 13 for circulation of water from a scrubber water circulation tank 15 to and from a first exhaust gas scrubber 1a of EGC type and also a pre-treatment process loop 16.

Starting with the scrubber process loop 13, this comprises the scrubber water circulation tank 15 having a first inlet 17 and a second inlet 18. The first inlet 17 is arranged in communication with a first outlet 11 of the first exhaust gas scrubber 1a forming part of the scrubber process loop 13. The second inlet 18 is arranged in communication with the pre-treatment process loop 16.

Further, the scrubber water circulation tank 15 has a first outlet 20 arranged in communication, via a main pump 23, with a first inlet 21 of the first exhaust gas scrubber 1a. A second outlet 33 of the scrubber water circulation tank 15 is arranged in communication with the pre-treatment process loop 16.

The scrubber process loop 13 is to be regarded as a closed loop.

The first exhaust gas scrubber 1a is arranged to be fed with a flow of fresh air from an air supply device in the form of a purge air fan 24. For this purpose, an outlet 12 of the purge air fan 24 is arranged in communication with a second inlet 4 of the first exhaust gas scrubber 1a. The used fresh air is arranged to be let out from the first exhaust gas scrubber via a second outlet 10. The second outlet 10 could be a separate outlet of the first exhaust gas scrubber 1a. However, in the system 100 illustrated in FIG. 2a, the same outlet, i.e. the second outlet 10, is used for the outfeed of both the exhaust gas cleaned by the first exhaust gas scrubber 1 and the purge air.

The pre-treatment process loop 16 is connected to the scrubber process loop 13 via the second outlet 33 and the second inlet 18 of the scrubber water circulation tank 15.

Starting from the second outlet 33 of the scrubber water circulation tank 15, the pre-treatment process loop 16 comprises a piping comprising a first inlet 26 comprising a first valve 27 and second inlet 29 comprising a second valve 30. The first valve 27 is connected to a supply 28 of an alkaline agent, such as NaOH (sodium hydroxide) or $Na_2CO_3$ (sodium carbonate), allowing a controlled supply of the alkaline agent to the pre-treatment process loop 16. The second valve 30 is connected to a supply 31 of $H_2O_2$ (hydrogen peroxide) allowing a controlled supply of $H_2O_2$ to the pre-treatment process loop 16. In the claims, the first and second inlets 26 & 29, the first and second valves 27 & 30, and the supplies 28 & 31, are referred to as means for chemicals supply. It is to be understood that the positions of the means for chemicals supply may be altered. Downstream of the second inlet 29 is a water cleaning unit 32.

The purpose of the water cleaning unit 32 is to minimize the amount of particulate matter being transferred back to the scrubber water circulation tank 15 or being discharged to the sea. Water cleaning units 32 as such are well known in the art. It may by way of example be a separator in the form of a high speed separator, a filter, a hydro cyclone or the like. Particulate matter collected by the water cleaning unit 32 may be stored in a tank (not disclosed) for later delivery at suitable reception facilities, while the cleaned scrubber water may be discharged overboard directly from the water cleaning unit 32 via an outlet 34. The water cleaned by the water cleaning unit 32 may alternatively be returned into the scrubber water circulation tank 15 via its second inlet 18.

It is to be understood that the cleaned scrubber water to be discharged overboard may undergo a quality control 41 before being discharged.

In some cases it might be suitable to arrange a small buffer tank (not disclosed) in a position between the water cleaning unit 32 and the inlets 26, 29 for supply of alkaline agent and $H_2O_2$. The purpose of such a buffer tank is to allow a sufficient dwell time for the chemicals supplied to the scrubber water to intermix and react therewith before reaching the water cleaning unit 32.

In the following the operation of the system 100 will be discussed. The system may be operated in two different modes, either an exhaust gas cleaning mode or an aeration mode. During operation of the system 100 scrubber water is continuously circulated through the first exhaust gas scrubber 1a and either exhaust gas or air, depending on the mode of operation, is pumped into the first exhaust gas scrubber 1a and thus the circulating scrubber water.

Starting with exhaust gas cleaning mode, reference is made to the initial paragraphs of the detailed description describing the overall function of an exhaust gas scrubber. Exhaust gas (EG) is fed from the combustion engine 2 to the first exhaust gas scrubber 1a. Accordingly, an outlet 19 of the combustion engine 2 is arranged to communicate with the second inlet 4 of the first exhaust gas scrubber 1a. The scrubber water is circulated in the scrubber process loop 13 from the first exhaust gas scrubber 1a via the scrubber water circulation tank 15 and back to the first exhaust gas scrubber 1a. During this circulation, the $SO_X$ contained in the exhaust gas reacts with the inherently alkaline scrubber water, whereby the $SO_X$ is absorbed in the scrubber water. If the inherent alkalinity is insufficient, a supply of an alkaline agent may be made in the scrubber process loop. Further, particulate matter contained in the exhaust gas will be washed out and accumulated in the circulating scrubber water. The thus circulating scrubber water will typically have a pH of 7-8.

During the exhaust gas cleaning mode, the amount of washed out particulate matter will accumulate in the circulating scrubber water.

To allow a treatment of the thus circulating scrubber water, a part stream or flow, or a full stream or flow, of scrubber water from the second outlet 33 of the scrubber water circulation tank 15 is let through the pre-treatment process loop 16.

During the passage through the pre-treatment process loop 16, alkaline agent may be added to the scrubber water via the first inlet 26.

The purpose of the addition of the alkaline agent is to adjust the pH value of the scrubber water by increasing the pH to a value within the range of 8-10 and more preferred to a range of 8.5-9.5. By the addition of an alkaline agent to the scrubber water in a position upstream the water cleaning unit 32, it has been shown that the efficiency of the particle separation to follow will be increased.

Further, while passing the second inlet 29 an optional addition of $H_2O_2$ (hydrogen peroxide) may be made. Hydrogen peroxide is very reactive with inorganic compounds contained in the scrubber water, whereby a very fast oxidization of the sulphites in the scrubber water is made possible. Thus, the supply of hydrogen peroxide may be used to further lower the COD value in line with the equations (1)-(3) discussed above.

Depending on the presence of any buffer tank (not disclosed) in the pre-treatment process loop 16, the resulting mixture of alkaline agent, $H_2O_2$ and scrubber water may be allowed to either stay in the buffer tank during a certain dwell time before being fed to the water cleaning unit 32, or be fed directly into the water cleaning unit 32.

The separated particulate matter will be stored in a suitable tank while the cleaned scrubber water either will be circulated back into the scrubber process loop 13 or be discharged overboard (via 41).

It is to be understood that the flow of scrubber water to the pre-treatment process loop 16 may be continuous or dis-continuous.

Accordingly, during the exhaust cleaning mode, SOx will be washed out from the exhaust gas while at the same time, either continuously or dis-continuously, particulate matter may be separated from the circulating scrubber water and the oxygen content of the circulating scrubber water may be increased by a supply of $H_2O_2$.

Now turning to the aeration mode. The system 100 may be operated in an aeration mode during a stand-still of the combustion engine 2, i.e. when no exhaust gas from the combustion engine 2 is fed into the first exhaust gas scrubber 1a. During such stand-still, the first exhaust gas scrubber 1a will instead of being supplied with exhaust gas, be fed with fresh air from the purge air fan 24. During the supply of fresh air by the purge air fan 24, the scrubber process loop 13 will be operated by circulating scrubber water from the scrubber water circulation tank 15 via the first exhaust gas scrubber 1a, aerating the same.

The purge air fan 24 may be electrically driven or be driven by an auxiliary combustion engine (not disclosed).

By the aeration, the oxygen level in the scrubber water passing the first exhaust gas scrubber 1a will be increased. Referring back to equations (1)-(3) and the discussion thereof given above, this means that the amount of oxygen present in the scrubber water will be increased to a level high enough to ensure that the process described by equations (1)-(3) will proceed with a complete oxidation of the $SO_2$ absorbed in the scrubber water. Accordingly, the COD value may be kept low and within legislated levels.

Based on experience, it is estimated that the aeration mode should be kept in operation for approximately 30-60 minutes to ensure an almost complete oxidation of the sulphites. However, the system 100 comprises an analytical equipment 14 arranged upstream the water cleaning unit 32 in the pre-treatment process loop 16 and including oxygen sensors or redox probes to determine when the aeration process has reached a sufficient level. By a redox probe is meant a probe measuring the reduction potential (also known as redox potential). The reduction potential is a measure of the tendency of a chemical species to acquire electrons and thereby be reduced. Reduction potential is measured in volts (V), or millivolts (mV). Each species has its own intrinsic reduction potential; the more positive the potential, the greater the species' affinity for electrons and tendency to be reduced.

When it is determined that the aeration process has reached a sufficient level, the scrubber water is not further aerated. This is because the risk of corrosion in the water cleaning unit increases with an increasing oxygen level of the scrubber water.

Figure 2B:
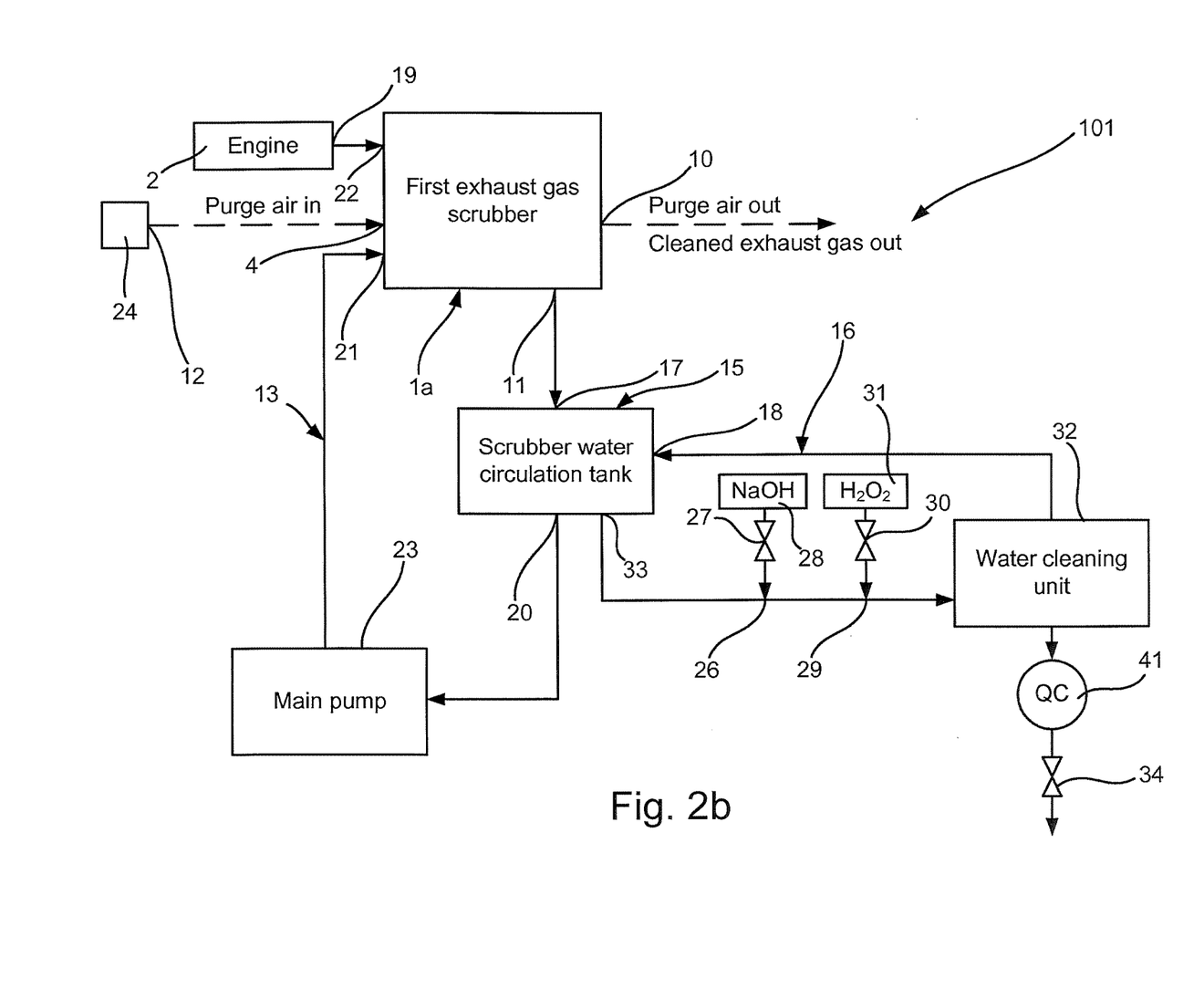
FIG. 2b is a schematic overview of a system according to another embodiment of the invention.

In FIG. 2b a system 101 according to an alternative embodiment of the invention is illustrated. The only difference between the systems 100 and 101 of FIGS. 2a and 2b is that the first exhaust gas scrubber 1a of FIG. 2b comprises a third inlet 22 arranged to communicate with the outlet 19 of the combustion engine 2 while the second inlet 4 of the first exhaust gas scrubber is still arranged to communicate with the outlet 12 of the purge air fan 24. Thus, here, the combustion engine 2 and the purge air fan 24 do no not share one and the same inlet of the first exhaust gas scrubber 1a.

Figure 3:
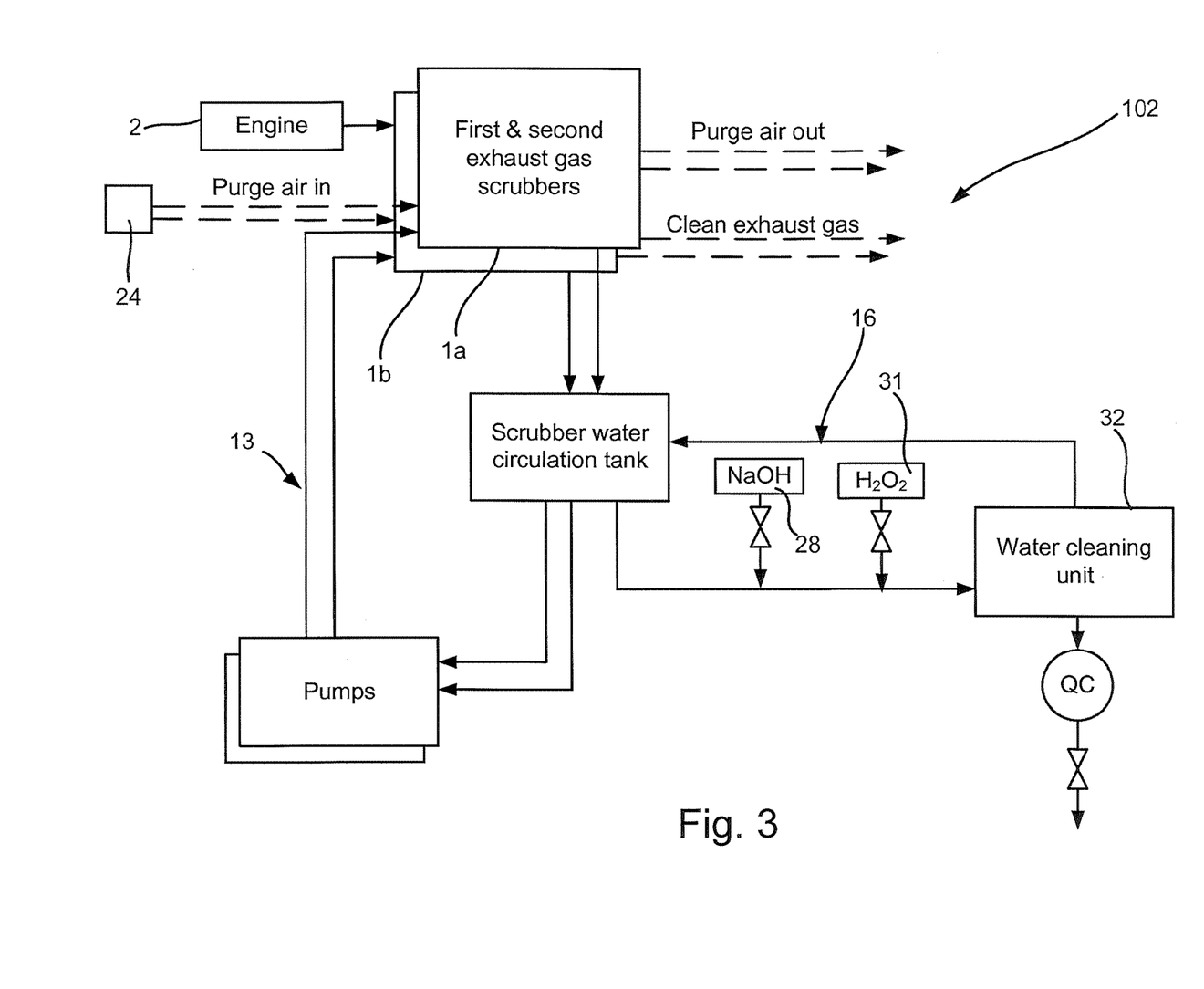
FIG. 3 is a schematic overview of a multi system according to an embodiment of the invention.

Now turning to FIG. 3, an embodiment of a multi system 102 in line with the invention will be disclosed.

The multi system differs from the systems of FIGS. 2a and 2b in that the scrubber process loop 13 comprises more than one, here two, exhaust gas scrubbers 1a, 1b of EGC type. The exhaust gas scrubbers 1a, 1b may have the same size but here, the exhaust gas scrubber 1a is smaller than the exhaust gas scrubber 1b.

The advantage of a multi system according to FIG. 3 as compared to the systems discussed in view of FIGS. 2a and 2b, is that one of the exhaust gas scrubbers 1a, 1b may be operated in an exhaust gas cleaning mode while at the same time the other one of the exhaust gas scrubbers 1a, 1b may be operated in aeration mode.

This provides a more redundant system, as the scrubbing is not solely relying on a single scrubber.

It goes without saying that all exhaust gas scrubbers 1a, 1b may at one and the same time be operated in either exhaust gas cleaning mode or aeration mode.

The operational philosophy of the multi system 102 is that while the ship is in harbor the main combustion engine 2 is not in operation, i.e. it is in a stand-still state. Hence, only one of the exhaust gas scrubbers 1a, 1b, typically the smallest first exhaust gas scrubber 1a, may be operated in exhaust gas cleaning mode to thereby clean exhaust gas from an auxiliary engine (not disclosed) required to operate the required facilities onboard. In this mode of operation, the other exhaust gas scrubber, typically the larger second exhaust gas scrubber 1b, may be used, in combination with the purge air fan 24, for scrubber water aeration, wherein fresh air is blown into the larger exhaust gas scrubber 1b via the purge air fan 24. When the main combustion engine 2 starts up, the exhaust gas from both the main combustion engine and the auxiliary engine may be gathered and cleaned in the second exhaust gas scrubber 1b. This releases the first exhaust gas scrubber 1a so that this may now be used in combination with the purge air fan 24 for aeration of the circulating scrubber water, wherein fresh air is blown into the smaller exhaust gas scrubber 1a via the purge air fan 24.

It is to be understood that each exhaust gas scrubber 1a, 1b may be provided with its own purge air fan 24. It is also to be understood that the purge air and the exhaust gas may be fed into the respective exhaust gas scrubbers through the same inlet instead of, as illustrated, through separate inlets.

As described above, at least a part flow of the circulating scrubber water may be fed into the pre-treatment process loop 16 where an alkaline agent may be added to the scrubber water for facilitating separation of particulate matter, and $H_2O_2$ may be added to the scrubber water for further aeration of it.

Based on experience, it is estimated that the aeration mode should be kept in operation for approximately 30-60 minutes to ensure an almost complete oxidation of the sulphites. Analytical instruments (not disclosed) such as oxygen sensors or redox probes may be used to determine when the aeration process has reached a sufficient level.

Figure 4:
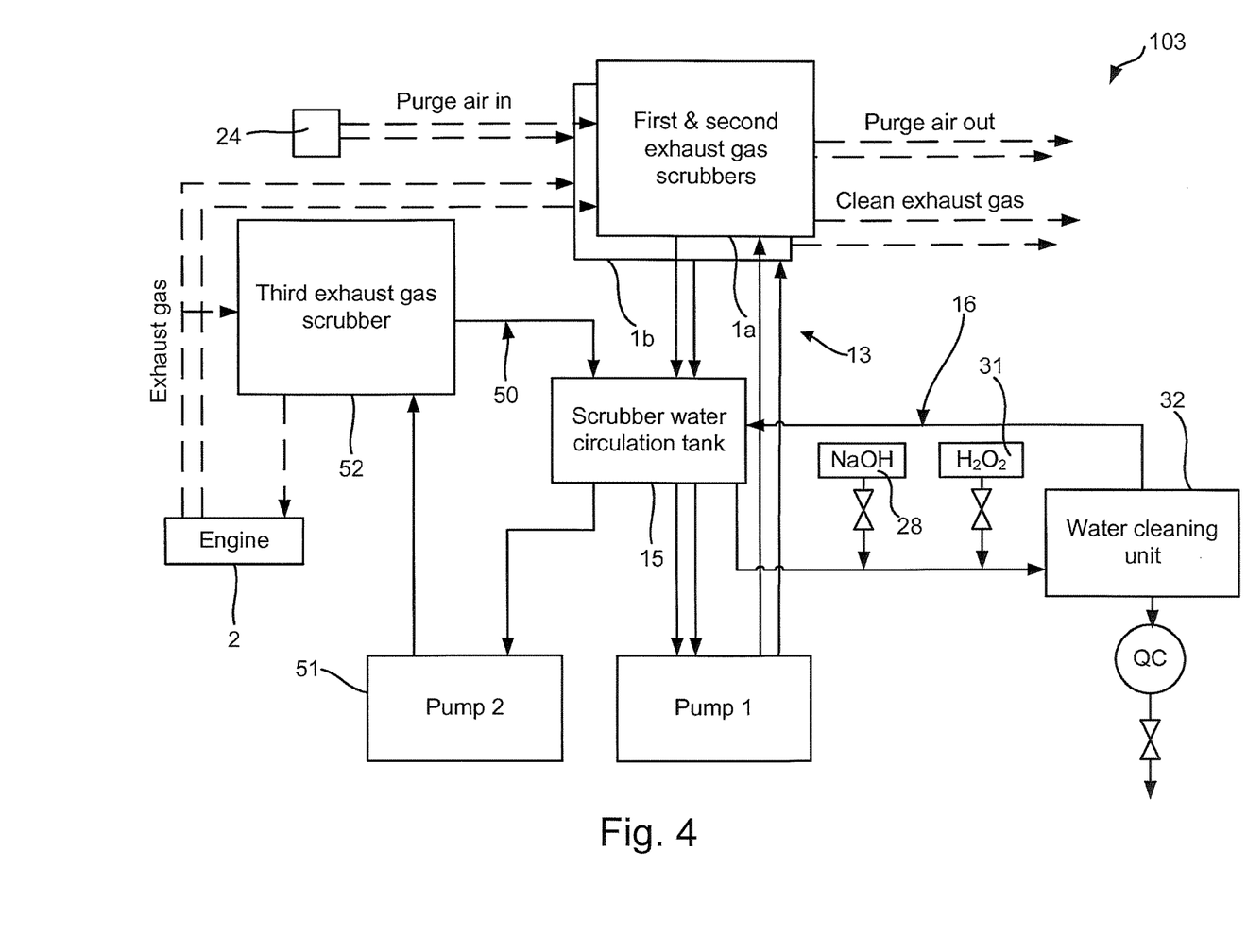
FIG. 4 is a schematic overview of a multi system according to another embodiment of the invention.

Now turning to FIG. 4, another embodiment of a multi system 103 in line with the invention will be disclosed.

The multi system disclosed in FIG. 4 differs from that of FIG. 3 in that the scrubber water circulation tank 15 is further connected to a scrubber water circulation loop 50 comprising a pump 51 and a third exhaust gas scrubber 52 of an EGR type. The third exhaust gas scrubber 52 is arranged on the high pressure side of the combustion engine 2 while the first and second exhaust gas scrubbers 1a, 1b of EGC type are arranged on the low pressure side of the combustion engine 2.

EGR scrubber processes as such are well known in the art and the general idea is to reduce the amount of nitrogen oxide ($NO_X$) in the exhaust gas to be emitted from the combustion engine 2, such as a diesel engine on-board a ship. The EGR scrubber 52 as such is a so called wet scrubber based on the same principle as the EGC scrubbers 1a and 1b. However, as a major difference to an EGC scrubber, an EGR scrubber only cleans a portion of the exhaust gas, which is re-circulated back into the combustion chamber of the combustion engine for the purpose of reducing the level of $NO_X$. Approximately up to 40% of the exhaust gas may be re-circulated back into the combustion engine 2. The re-circulated exhaust gas replaces some of the excess oxygen in the resulting pre-combustion mixture. The thus lowered oxygen level increases the level of carbon dioxide ($CO_2$). $NO_X$ is primarily formed when a mixture of nitrogen and oxygen is subjected to a high temperature. However, the combustion air circulated back to the combustion engine 2 through the EGR scrubber has the effect that the combustion temperature is reduced. Consequently the level of $NO_X$ formed in the exhaust gas may be reduced. Like the EGC scrubbers 1a and 1b, the EGR scrubber 52 may in general use seawater or freshwater, or even a combination thereof.

The operation of the multi system 103 is in all essential parts the same as previously discussed. To avoid undue repetition, where suitable, reference is made to the embodiment discussed in view of FIG. 3.

As mentioned above, the major difference is that the scrubber water circulation tank 15 is further connected to the scrubber water circulation loop 50 comprising the pump 51 and the third exhaust gas scrubber 52. Accordingly, the scrubber water is not only circulated in the scrubber process loop 13 via the first and second exhaust gas scrubbers 1a, 1b and in the pre-treatment process loop 16 but also in the scrubber water circulation loop 50 serving the third exhaust gas scrubber 52.

The operational philosophy of the multi system 103 is that while the ship is in harbor the main combustion engine 2 is not in operation, i.e. it is in a stand-still state. Hence, only one of the EGC exhaust gas scrubbers 1a, 1b, typically the smallest first exhaust gas scrubber 1a, may be operated in exhaust gas cleaning mode to thereby clean exhaust gas from an auxiliary engine (not disclosed) required to operate the required facilities onboard. In this mode of operation, the other EGC exhaust gas scrubber, typically the larger second exhaust gas scrubber 1b, may be used for scrubber water aeration. The EGR or third exhaust gas scrubber 52 may be idle or operated to re-circulate exhaust gas into the auxiliary engine (not illustrated). A separate EGR scrubber (not illustrated) could be provided for the auxiliary engine.

When the main combustion engine 2 starts up, the exhaust gas from both the main combustion engine 2 and the auxiliary engine may be gathered and cleaned in the second exhaust gas scrubber 1b. This releases the first exhaust gas scrubber 1a so that this may now be used for scrubber water aeration. During operation of the main combustion engine 2, the third exhaust gas scrubber 52 is operated to re-circulate exhaust gas into the engine 2 and possibly also the auxiliary engine (not illustrated).

It is to be understood that each exhaust gas scrubber 1a, 1b may be provided with its own purge air fan 24.

As described above, at least a part flow of the circulating scrubber water may be fed into the pre-treatment process loop 16 where alkaline agent may be added to the scrubber water for facilitating separation of particulate matter, and $H_2O_2$ may be added to the scrubber water for further aeration of it.

Based on experience, it is estimated that the aeration mode should be kept in operation for approximately 30-60 minutes to ensure an almost complete oxidation of the sulphites. Analytical instruments (not disclosed) such as oxygen sensors or redox probes may be used to determine when the aeration process has reached a sufficient level.

It is to be understood that also the EGR scrubber 52 may be set to be operated in an aeration mode.

It goes without saying that the first, second and third exhaust gas scrubbers 1a, 1b and 52 may at one and the same time be operated in either exhaust gas cleaning mode or aeration mode.

Throughout the description, the embodiments of the invention have been based on an embodiment of an exhaust gas scrubber 1a, 1b and 52 comprising a first and a second chamber 3, 7 respectively, wherein the main purpose of the first chamber 3 is to rapidly cool down the exhaust gas from the combustion engine 2. It is to be understood that the step of cooling down may be omitted and hence also the first chamber 3.

It is also to be understood that there are numerous exhaust gas scrubbers available on the market and that the invention should not be limited to the design and the operation of the individual exhaust gas scrubber, no matter if it is a scrubber of the EGC or EGR type. By way of example, it is possible to use so called multiple inlet scrubbers allowing a plurality of combustion engines to be connected thereto.

Further, it is to be understood that there are numerous water cleaning units available for the purpose of separating particulate matter from a liquid, whereby the invention should not be limited to the embodiments described.

Also, other air supply devices than purge air fans may be used in connection with the present invention, such as a blower, a compressor, etc.

Furthermore, the exhaust gas scrubbers of a multi system according to the invention need not share one and the same scrubber water circulation tank but may communicate with one scrubber water circulation tank each.

The analytical equipment 14 need not be positioned according to FIG. 2a but could be positioned elsewhere, such as somewhere in the scrubber process loop 13.

The quality of the circulating scrubber water and also the quality of the water to be discharged may be checked by a quality control system QC well known in the art. The quality system may by way of example comprise a plurality of sensors. As non-limiting examples, one or several of the following sensors may be used: pH sensors, oxygen sensors, redox probes, turbidity sensors and PAH-sensors (Poly Aromatic Hydrocarbon).

Finally, the hydrogen peroxide and/or the alkaline agent need not be supplied to the scrubber water before it is fed to the water cleaning unit but could instead be supplied to the cleaned scrubber water when this leaves the water cleaning unit.

From the description above follows that, although various embodiments of the invention have been described and shown, the invention is not restricted thereto, but may also be embodied in other ways within the scope of the subject-matter defined in the following claims.

The invention claimed is:

1. A system for cleaning exhaust gas (EG) from a combustion engine, comprising a first exhaust gas scrubber connected to a scrubber water circulation tank to communicate with the scrubber water circulation tank, a first outlet of the first exhaust gas scrubber being connected to a first inlet of the scrubber water circulation tank and a first inlet of the first exhaust gas scrubber being connected to a first outlet of the scrubber water circulation tank to enable circulation of scrubber water between the scrubber water circulation tank and the first exhaust gas scrubber, an air supply device connected to the first exhaust gas scrubber to feed air into the first exhaust gas scrubber to aerate the scrubber water during its passage through the first exhaust gas scrubber, a second inlet of the first exhaust gas scrubber being connected to an outlet of the air supply device, and means for chemicals supply to a flow of scrubber water from a second outlet of the scrubber water circulation tank.

2. A system according to claim 1, wherein the air supply device is connected to the first exhaust gas scrubber to feed air into the first exhaust gas scrubber when no exhaust gas (EG) from the combustion engine is fed into the first exhaust gas scrubber.

3. A system according to claim 1, wherein the second inlet of the first exhaust gas scrubber is connected to an outlet of the combustion engine.

4. A system according to claim 1, wherein the air supply device is a purge air fan.

5. A system according to claim 1, wherein the means for chemicals supply supplies at least one of hydrogen peroxide ($H_2O_2$) and an alkaline agent.

6. A system according to claim 1, further comprising an analytical equipment to evaluate a degree of oxidation of sulphites in the aerated scrubber water.

7. A multi system for cleaning exhaust gas (EG) from a combustion engine comprising a system according to claim 1 and a second exhaust gas scrubber connected to the scrubber water circulation tank to communicate with the scrubber water circulation tank and enable circulation of scrubber water between the scrubber water circulation tank and the second exhaust gas scrubber, wherein the second exhaust gas scrubber is receives and cleans the exhaust gas (EG) while the first exhaust gas scrubber aerates the scrubber water during its passage through the first exhaust gas scrubber.

8. A multi system according to claim 7, comprising a third exhaust gas scrubber connected to the scrubber water circulation tank to communicate with the scrubber water circulation tank and enable circulation of scrubber water between the scrubber water circulation tank and the third exhaust gas scrubber.

9. A multi system according to claim 7, wherein one of said exhaust gas scrubbers is of EGR type.

10. Use of a system according to claim 1 for alternating operation between aeration of scrubber water during its passage through the first exhaust gas scrubber and cleaning of exhaust gas (EG) from the combustion engine.

* * * * *